UNITED STATES PATENT OFFICE.

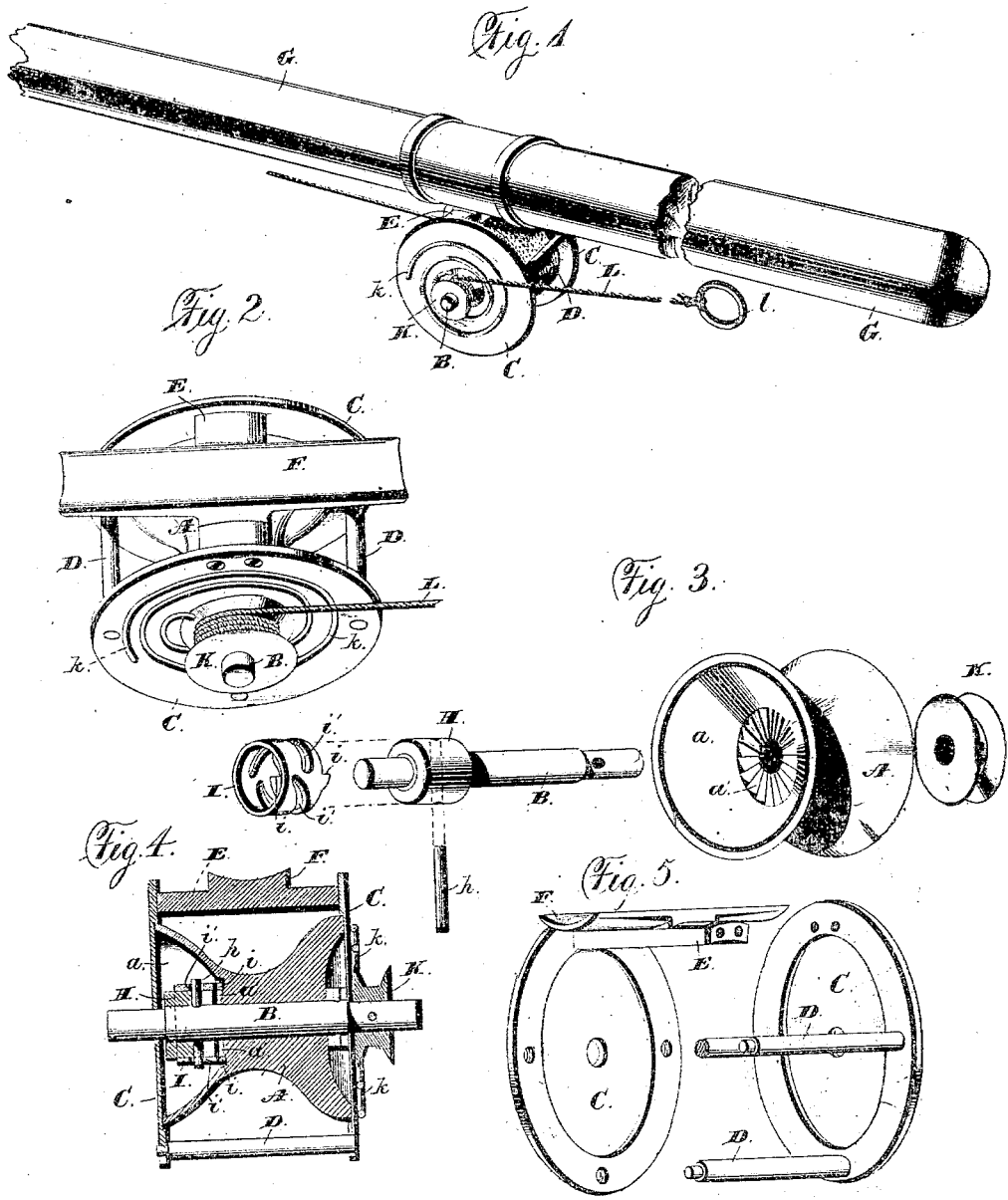

CHARLES F. GILLET, OF SPRINGFIELD, ILLINOIS.

FISH-LINE REEL.

SPECIFICATION forming part of Letters Patent No. 389,070, dated September 4, 1888.

Application filed March 9, 1887. Serial No. 230,261. (No model.)

*To all whom it may concern:*

Be it known that I, CHARLES F. GILLET, of Springfield, in the county of Sangamon, and in the State of Illinois, have invented certain new and useful Improvements in Fish-Line Reels; and I do hereby declare that the following is a full, clear, and exact description thereof, reference being had to the accompanying drawings, in which—

Figure 1 is a perspective view of my reel in position upon a fishing-rod. Fig. 2 is a like view of said reel, enlarged, when separated from the rod. Fig. 3 is a perspective view of the parts of the reel separated from each other. Fig. 4 is a central section of said reel upon a line of its axis of rotation, and Fig. 5 is a perspective view of the frame of the apparatus separated from the operative parts.

Letters of like name and kind refer to like parts in each of the figures.

My invention relates to a fish-line reel in which, when it is desired to take up the slack of the line, the spool is caused to revolve by means of a cord that passes around a pulley upon said spool and is drawn rearward by the operator; and to this end it consists, principally, in the means employed for connecting the operating-pulley with the line-spool, substantially as and for the purpose hereinafter specified.

It consists, further, in the means employed for returning the operating-pulley to its normal position when moved therefrom, substantially as and for the purpose hereinafter shown.

It consists, finally, in the construction and combination of the parts of the reel, substantially as and for the purpose hereinafter set forth.

In the carrying of my improvements into practice I employ a line-spool, A, of usual construction, which spool is loosely journaled upon a shaft, B, and such shaft in turn journaled within a frame that is composed of two round heads, C and C, which have a larger diameter than said spool and are secured together and held in relative positions by means of three pillars, D and D, and a bar, E, which extend between their edges and have their ends secured therein or thereto, said pillars and bar being arranged at equidistant points. To the outer side of said bar E, which is located at the upper side of said frame, is attached transversely a second bar, F, which has its upper side curved to adapt it to fit upon the lower side of a fish-pole, G, where it is secured in any usual way and operates to hold the reel in position upon said pole. The ends of the spool A are recessed, and at the inner end of one of such recesses $a$ is an annular toothed ring, $a'$, which is formed upon or attached to said spool. Secured upon the shaft B between said toothed ring and the adjacent head C is a cylindrical collar, H, which has a diameter somewhat less than that of the inside of said ring, and has loosely journaled upon its periphery a sleeve, I, which is provided at its inner end with a number of teeth, $i$, that are adapted to engage with the teeth of the latter. The sleeve I has cut within its periphery a groove, $i'$, which extends in a spiral form inward from near its outer end and engages with a stud, $h$, that projects radially into the same from the collar H, the arrangement being such that when said sleeve and collar are oppositely rotated in one direction the former will be moved longitudinally inward, so as to cause its teeth $i$ to engage with the toothed ring $a'$, while, when said parts are oppositely rotated in an opposite direction, said sleeve will be moved longitudinally outward, so as to release its teeth from engagement with said ring.

Upon one of the projecting ends of the shaft B, preferably the left-hand end, is secured a pulley, K, which is connected with the contiguous head C by means of a spiral spring, $k$, that has one of its ends secured to said pulley or to said shaft and its opposite end to said head, the arrangement being such as to permit said pulley and its shaft to be rotated one or more times in one direction and to cause them to be returned to their normal position when released. Such rotation is effected by means of a cord, L, which has one end secured to the periphery of said pulley, is then passed around the same one or more times, and then, extending rearward to a point near the left hand of the operator when using the rod, is provided at its rear end with a ring, $l$, or other suitable means for engagement by one of the fingers of said hand.

The relative arrangement of the parts of my device is such that when the shaft C is rotated by a sharp rearward pull of the actuating-cord L the first effect will be that the collar H will be moved within the sleeve I in the direction necessary to force the latter longitudinally into engagement with the toothed ring a of the spool A, after which said sleeve and spool will be rotated in the same direction as said shaft, and the momentum of said spool will cause it to revolve many times after said other parts have ceased to move forward and have turned rearward to their normal positions.

It will be obvious that the engagement between the inner end of the slotted band and the contiguous portion of the line-spool may be effected by other means than that shown—as by the substitution of any of the usual forms of friction-surfaces or clutch-faces in place of the toothed faces used—without departure from the spirit of this part of my invention, the essential feature of which is the slotted sleeve that is caused to move longitudinally inward into engagement by its inertia when the operating-shaft is quickly revolved forward and is automatically moved out of engagement by its momentum when the forward movement of said shaft ceases.

By means of the construction shown the slack of a line may be quickly and easily drawn in, for which purpose it is only necessary that the operator give a sharp pull with his finger upon the operating-cord, while when not thus manipulated the mechanism offers no obstacle to the free rotation of the line-spool in the direction necessary for the running out of the line.

When there is a strain upon the line and it is desired to prevent said line from running out any farther, the spool may be locked in place by pulling the operating-cord sharply to the rear and then holding it in such position while it is desired to lock said spool.

Having thus described my invention, what I claim is—

1. As an improvement in fishing-tackle, a fish-line reel in which is combined an operating-shaft, a spool that is loosely journaled upon the same, a clutch-sleeve which is placed upon one end of said shaft, is capable of independent circumferential and longitudinal movement thereon, and is provided with a spiral groove or slot that engages with a pin or stud upon said shaft, whereby a sudden rotation of the latter will cause said sleeve to be moved against the contiguous end of said spool, substantially as and for the purpose specified.

2. As an improvement in fishing-tackle, a fish-line reel in which is combined an operating-shaft, means for rotating the shaft in a forward direction and for then returning the same to its normal position, a spool that is loosely journaled upon the body of said shaft, a sleeve which is placed upon one end of the same and is adapted to have a combined circumferential and longitudinal movement with relation thereto, and means, substantially as described, whereby a sudden rotation of said shaft will cause said sleeve to be moved against and to engage with the contiguous end of said spool, substantially as and for the purpose shown.

3. As an improvement in fish-line reels, an organization in which is combined a shaft that is journaled within a suitable frame, a line-spool which is journaled upon the shaft, a sleeve that is journaled upon the latter at one end of the spool, is provided with one or more spiral slots which are each engaged by a pin that extends radially from said shaft into the same, and is adapted when moved longitudinally inward to engage with said spool, and means whereby said shaft may be rotated in one direction and when released will be revolved in an opposite direction to its normal position, substantially as and for the purpose set forth.

4. In combination with the fish-pole and with the operating-shaft, which is supported thereby and is provided with a spiral spring for holding it in and returning it to its normal circumferential position, a pulley that is secured upon one end of said shaft, and a cord which is passed one or more times around the pulley, with one of its ends secured to the periphery of the same and its opposite outer end extended rearward in position to be engaged by the finger of the operator, substantially as and for the purpose shown and described.

In testimony that I claim the foregoing I have hereunto set my hand this 1st day of March, 1887.

CHAS. F. GILLET.

Witnesses:
 JOSEPH M. GROUT,
 J. C. MATHIS.